G. SCHOCK.
BARREL-WASHER.
No. 173,422.　　　　　　　　Patented Feb. 15, 1876.
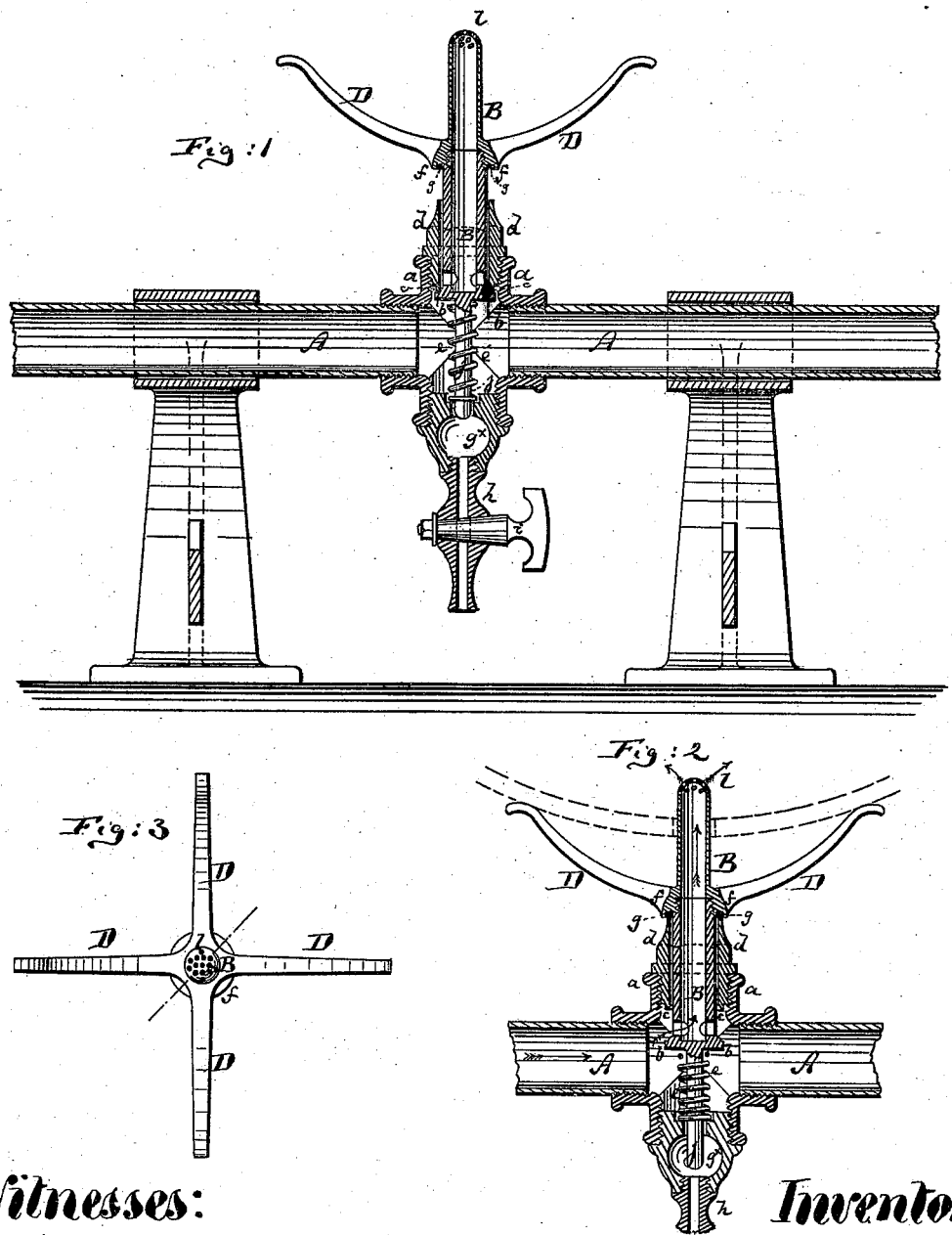

UNITED STATES PATENT OFFICE.

GUSTAV SCHOCK, OF NEW YORK, N. Y.

IMPROVEMENT IN BARREL-WASHERS.

Specification forming part of Letters Patent No. 173,422, dated February 15, 1876; application filed January 22, 1876.

*To all whom it may concern:*

Be it known that I, GUSTAV SCHOCK, of the city of New York, county and State of New York, have invented a new and Improved Barrel-Washer, of which the following is a specification:

Figure 1 is a vertical central section of my improved barrel-washer, showing its valve closed. Fig. 2 is a similar view of the same, showing its valve opened. Fig. 3 is a top view of the same.

Similar letters of reference indicate corresponding parts in all the figures.

This invention relates to a new barrel-washer, in which the washing-pipe and the barrel-supports are rigidly united and made vertically movable, so that when the barrel is put on the supports it will cause them to descend and the pipe to be opened, all as hereinafter more fully described.

In the drawing, the letter A represents a horizontal supply-pipe for the water or other liquid which is used for washing the barrels or other vessels. This pipe is supported on a suitable frame-work, and has a vertical branch, $a$, at every place at which a barrel-washer is to be applied. Into every vertical branch $a$ of the pipe A is fitted a vertically-movable pipe, B, which, at its lower part, carries an enlargement or valve, $b$, which is, by the pressure of the water, held against an annular valve-seat, $c$. The seat $c$ is formed in the branch $a$, or in a tube, $d$, that is, or may be screwed into the same, as shown. A spring, $e$, may be applied against the closed lower end of the pipe B, to insure the closing of the valve $b$. The pipe B extends loosely through the branch $a$ and tube $d$, and projects above the same, and terminates at its upper end in rose or sprinkler $l$. Below this rose or sprinkler are attached to, and rigidly connected with, the pipe B two or more projecting arms, D D, which constitute the barrel-support. The pipe B is closed at its lower part, so that when the valve $b$ is closed, as in Fig. 1, no liquid can enter said pipe from the pipe A; but above the valve $b$ the pipe has an aperture or apertures, so that when a barrel is placed upon the brackets D D, and the pipe B thereby slid down, and the valve opened, as in Fig. 2, the liquid from the pipe A will enter the pipe B, and thereby also the barrel, for the barrel is so placed upon the brackets D that the pipe B will enter its bung-hole, and wash it with the liquid that flows through such pipe. The pipe B has above the branch $a$ and tube $d$ an outer flange or shoulder, $f$, which, at its under side, carries a cushion, $g$, of lead, rubber, or other proper material, and which, by the weight of the barrel, is forced upon the upper end of the tube $d$, as in Fig. 2, to close the annular space between the pipe B and branch $a$ and tube $d$, and prevent water from escaping around the pipe B. Directly below the pipe B I propose and prefer to form a chamber, $g^\times$, and to provide the same with a short pipe, $h$, and cock $i$, to allow a small escape of water in winter, and prevent freezing. The chamber $g^\times$ also permits the application of a guide-rod, $j$, to the lower end of the sliding pipe B, as shown.

I claim as my invention—

1. The barrel-washer composed of the sliding perforated pipe B, which carries the barrel-supports D D, substantially as described.

2. The combination, in a barrel-washer, of the sliding perforated pipe B with the valve $b$, and with the valve-seat $c$ above said valve, substantially as specified.

3. The combination of the sliding perforated pipe B with the shoulder $f$, and with embracing-tube $d$ or $a$, to constitute a valve when the pipe B is slid down, substantially as specified.

4. In combination with the sliding pipe B of a barrel-washer, the chamber $g^\times$ and pipe $h$, substantially as and for the purpose specified.

GUSTAV SCHOCK.

Witnesses:
ERNEST C. WEBB,
F. V. BRIESEN.